United States Patent [19]

Ramsey et al.

[11] 4,227,663
[45] Oct. 14, 1980

[54] REFURBISHABLE AERIAL CARGO DELIVERY SYSTEM AND SOLID STATE CIRCUIT THEREFOR

[75] Inventors: Vernon B. Ramsey, Lewisburg; Donald E. Woods, Shelbyville, both of Tenn.

[73] Assignee: Teledyne Inc., Los Angeles, Calif.

[21] Appl. No.: 875,483

[22] Filed: Feb. 6, 1978

[51] Int. Cl.³ ............................................. B64D 17/56
[52] U.S. Cl. .................................... 244/149; 244/152
[58] Field of Search ............................... 244/147–152, 244/122 AE, 122 AH; 340/27 AT; 73/384, 386, 387; 102/35.6; 89/1 B; 324/115

[56] References Cited

U.S. PATENT DOCUMENTS

| | | | |
|---|---|---|---|
| 3,388,879 | 6/1968 | Pisano | 244/152 |
| 3,547,383 | 12/1970 | Carpenter | 244/150 |

*Primary Examiner*—Edward R. Kazenske
*Assistant Examiner*—Reinhard J. Eisenzopf
*Attorney, Agent, or Firm*—Jim Zegeer

[57] ABSTRACT

There is disclosed an electronic barometric staging unit or aerial cargo delivery actuator for use with cargo carrying or recovery parachutes having an electronic pressure sensing assembly for initiating actuating of a deployment or staging line cutter such that parachute canopy directing and deployment occurs as a programmed function of a barometrically corrected altitude. The invention features a two-part housing assembly carrying the relatively expensive portion of the assembly that is reusable and an expendible or discardable portion of the assembly so that by recovering or retrieving the electronic module, it may be mated up with a new portion so as to substantially reduce the cost of subsequent usages of the apparatus. Since the barometric transducer per se is solid state and of extremely light weight, deceleration moments due to impacting the ground do not in any way impair its operation so that it may be recovered for re-use. The battery pack and the pyrotechnically activated cutter itself are the basic components which are not re-used.

12 Claims, 6 Drawing Figures

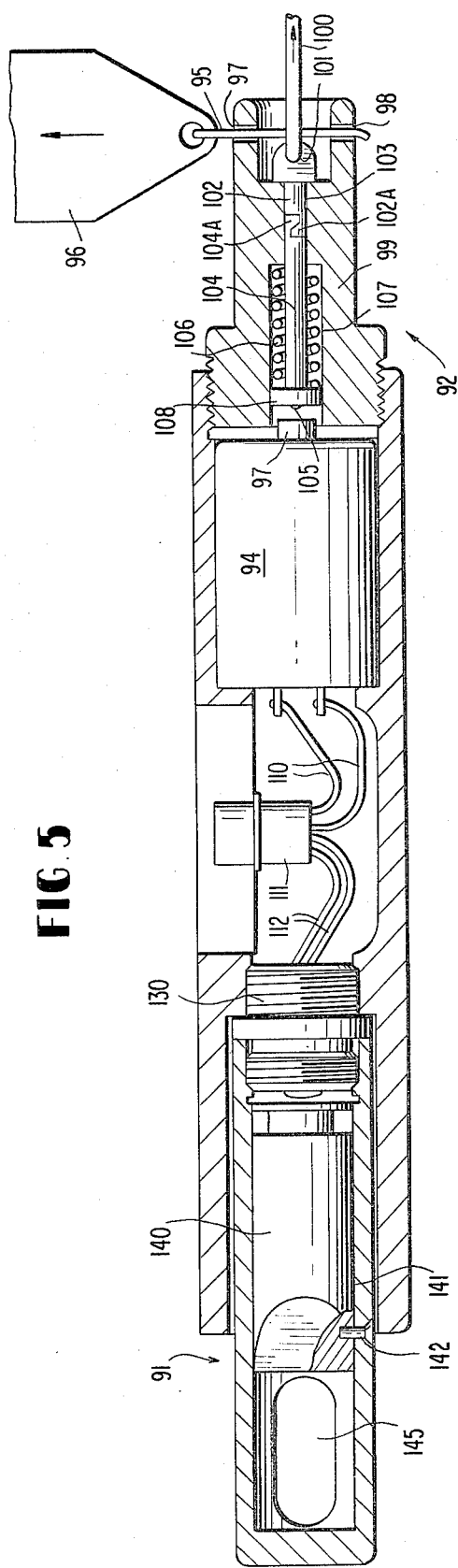
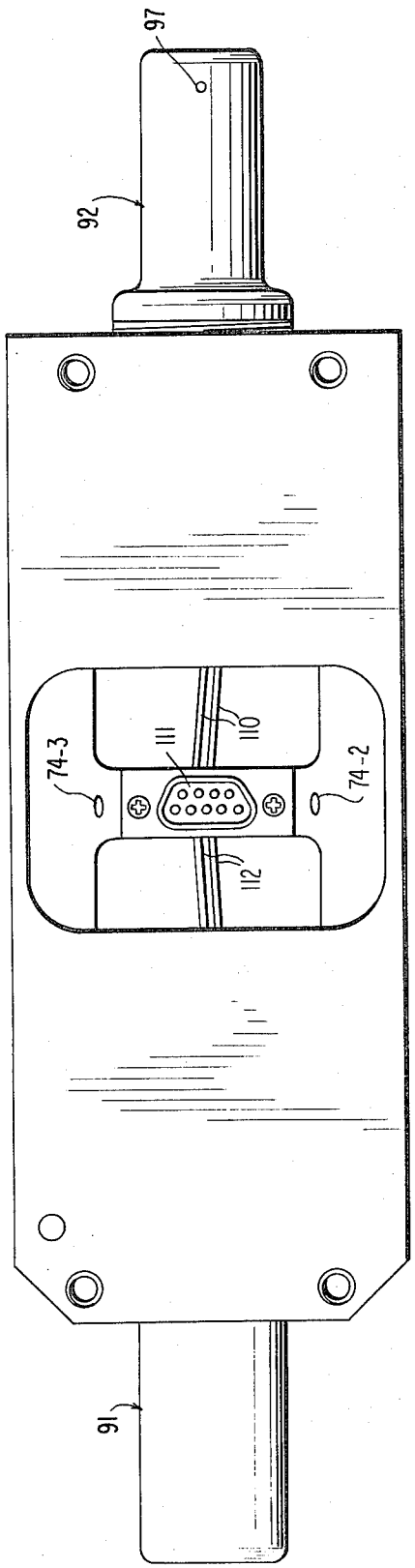
FIG. 5
FIG. 4

REFURBISHABLE AERIAL CARGO DELIVERY SYSTEM AND SOLID STATE CIRCUIT THEREFOR

BACKGROUND OF THE INVENTION

The present invention relates to an electronic barometric sensor unit coupled with a refurbishment module for accurately controlling the detonation of a cutter device for deploying cargo carrying or recovery parachutes as a function of a programmed, barometrically sensed altitude.

Aerial cargo delivery utilizing staged conventional parachute deployment is an established art and has been practiced by the assignee hereof for many years. Historically, the staging or deployment line cutter was actuated by devices which utilized either chemical or electronic time delay means to provide parachute dereefing at an approximate altitude. In other words, the altitude of the aircraft was noted by the operator and a time delay was initiated upon movement of the parachute and cargo from the aircraft which, related to the rate of movement of the parachute and cargo from the aircraft provided a staging of the parachute at an approximate altitude. The time delayed actuation approach requires that the aircraft be at a precisely defined altitude which may be undesirable due to weather conditions, and/or other strategic considerations. Moveover, such delayed actuation approaches are hindered by variables attributable to mechanical and electrical inertia. It is also known in the art to provide dereefing actuators which use mechanical barometric pressure transducers usually of the aneroid capsule type. Aneroid barometric actuation is dependent upon the dropping aircraft altitude and is advantageous when compared with the time delayed reaction stages. Mechanical barometric transducers or switches are not acceptable as an aerial cargo delivery actuation means because of the relatively poor repeatability and the relative high cost since the capsule upon impact with the ground and deceleration forces that it experiences renders it, generally, not useful for further staging operations. Actuation by mechanical barometric means therefore does not appear to offer a net advantage over staging by delayed actuation means described earlier. Essentially all of the prior art staging units have been of the one use—expendible variety.

SUMMARY OF THE INVENTION

The present invention is directed to an electronic staging unit for aerial cargo delivery actuations which is usable over and over. A first housing assembly is provided for carrying the relatively expensive electronic components which are the altitude sensing components and a second housing assembly is provided for carrying the consumable and/or expendible components, such as the battery-activator and cutter blade system. Preferably, the perimetrical outlines of the two housing assemblies mate and electrical connector elements secured in the respective housing assemblies complete the electric system. In addition, the present invention utilizes a commercially available electronic barometric pressure transducer for producing a voltage which is directly proportional to barometric pressure. A programmable precision reference source is provided which is preset by a plurality of programmable switches to provide an analog voltage of the barometrically corrected altitude at which staging is to occur. Barometric correction is achieved by setting a predicted barometric pressure at the drop zone into the instrument which is used to modify the altitude voltage which is likewise preset into the instrument. The altitude voltage is constituted in two parts by a coarse altitude selector switch which taps into a string or ladder of resistances which are proportioned to take into account the non-linearity and altitude change with barometric pressure. At the same time, in a preferred embodiment of the invention, this voltage is supplied to a negative feedback amplifier and a portion of this voltage is used to supply a second resistance ladder network which is constituted by a string of uniform valued resistors. Selected discrete levels of this voltage are then added to the coarse selected voltage to provide a precise altitude selected voltage. Furthermore, a further voltage selection is utilized coupled to the same string of resistance elements to provide a barometric pressure correction voltage which is likewise added to the altitude voltage. This voltage, then, is used as a reference and is applied to a voltage comparator which continuously compares the magnitude of the voltage provided by the electronic barometric sensor. The voltage comparator output is a discrete level change as the barometric sensor analog voltage traverses the reference voltage set point. This level change passes through a controlled time delay circuit which permits avoidance of the effects of turbulence around the aircraft from actuating the device, to an electronic switch which controls a pyrotechnic detonator for actuating a staging line cutter.

BRIEF DESCRIPTION OF THE DRAWINGS

FIG. 4 is a top elevational view of the discardible portion of the assembly with the electronics package removed, FIG. 5 is a cross-sectional view of the discardible unit shown in FIG. 4 (the safety tag is shown in place)

GENERAL DESCRIPTION

Figure 6:
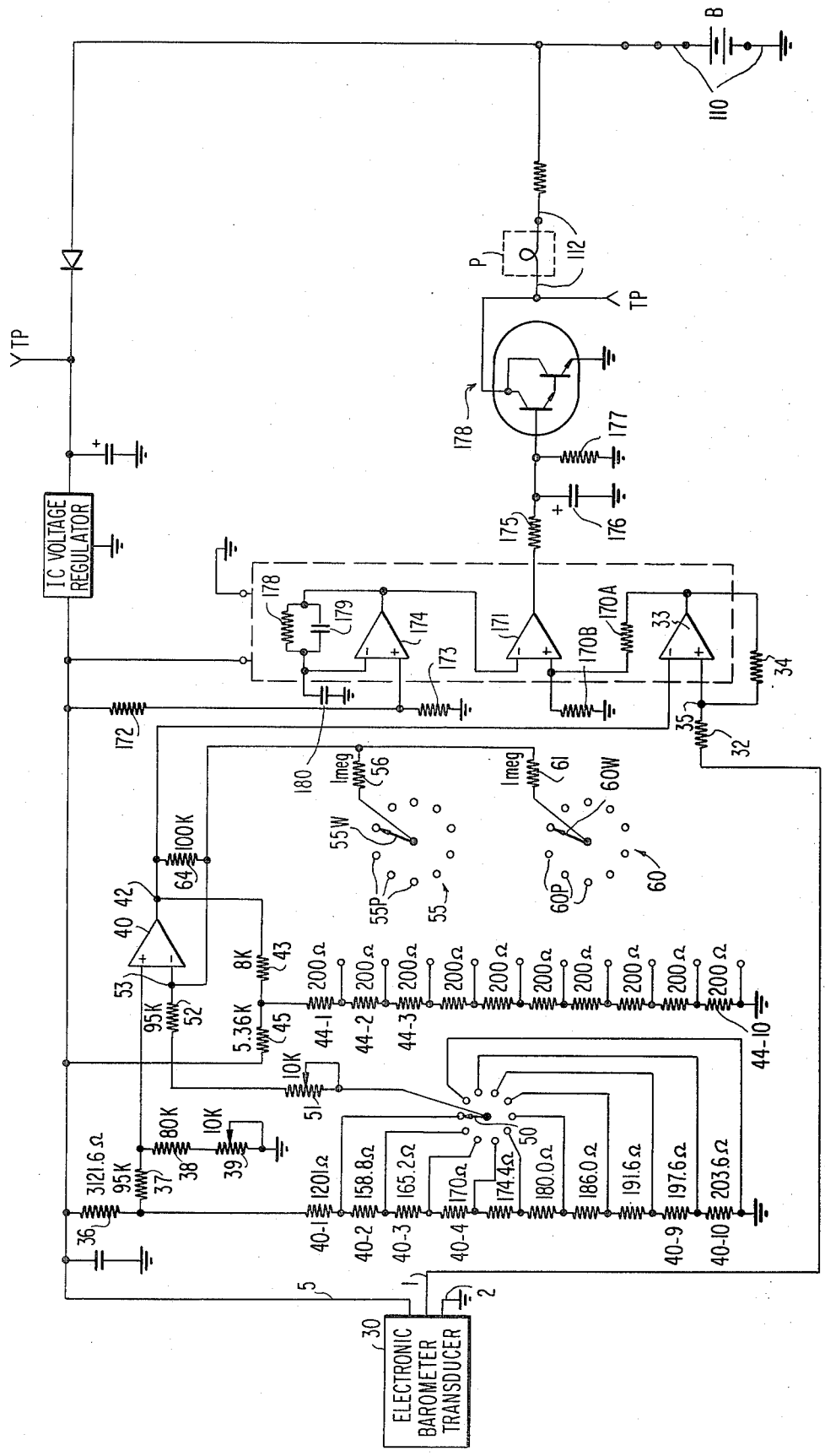
FIG. 6 is a detail electrical schematic circuit diagram incorporating the invention.

The electronic staging unit disclosed herein utilizes an electronic barometric altitude sensing system and circuits which are shock, vibration and temperature resistant and which are incorporated in a separable housing portion from the battery-activator system and the cutter blade and cutter blade delivering system. It may be thought of as packaging the brains in one assembly and the muscles and energy source in another, replaceable assembly. The altitude sensor module 70 constitutes the cover assembly of the device and contains the sensor electronics and calibration/set controls to adjust the altitude activation range from 0 to 9,900 feet in one hundred foot increments. Moreover, the controls enable setting of the ambient barometric pressure, i.e., 29.5 to 30.4 inches of mercury. The sensor electronics is made up from discrete and integrated circuits as shown in FIG. 6. The pressure transducer is an integrated circuit device as disclosed in an article appearing in *Electronics* for Dec. 4, 1972 entitled "Integration Brings A New Generation of Transducers" by Zias and Heyer at page 83. The title of the article is "Integration Brings a New Generation of Low Cost Transducers" and is incorporated herein by reference. Commercially available transducers are marketed by National Semiconductor Corporation under the designation LX1600 (with various suffix designations for different models). Such transducer has relatively good accuracy for the use intended and in the packaging assembly herein is contained on the innerside of the altitude sensor module.

ELECTRONICS MODULE

Figure 1:
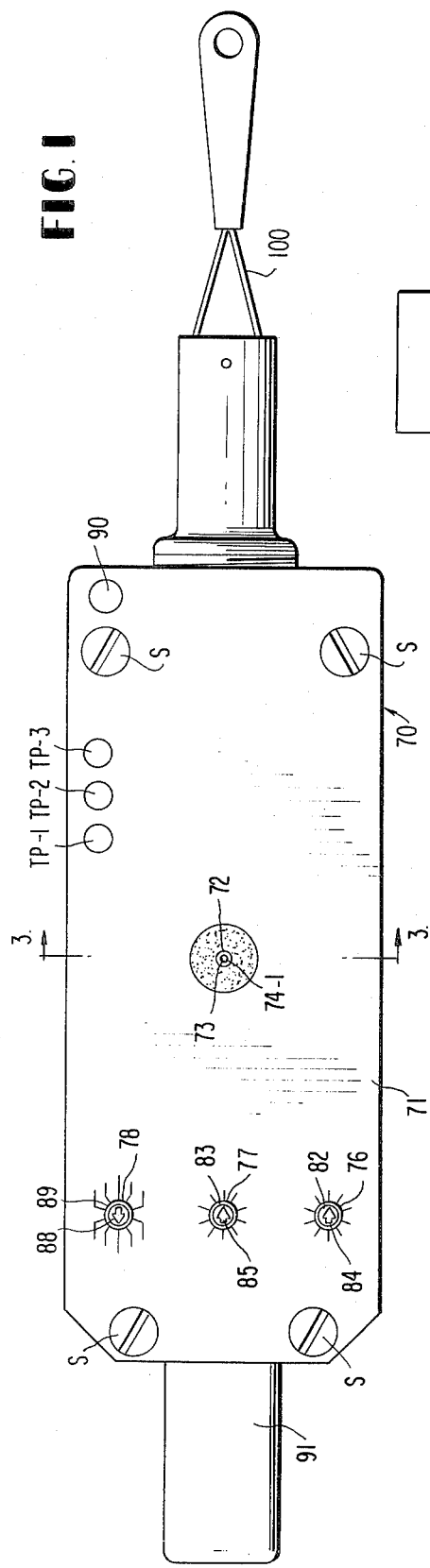
FIG. 1 shows a top plan view of the staging unit in which the safety-pin tag has been removed.
Figure 2:
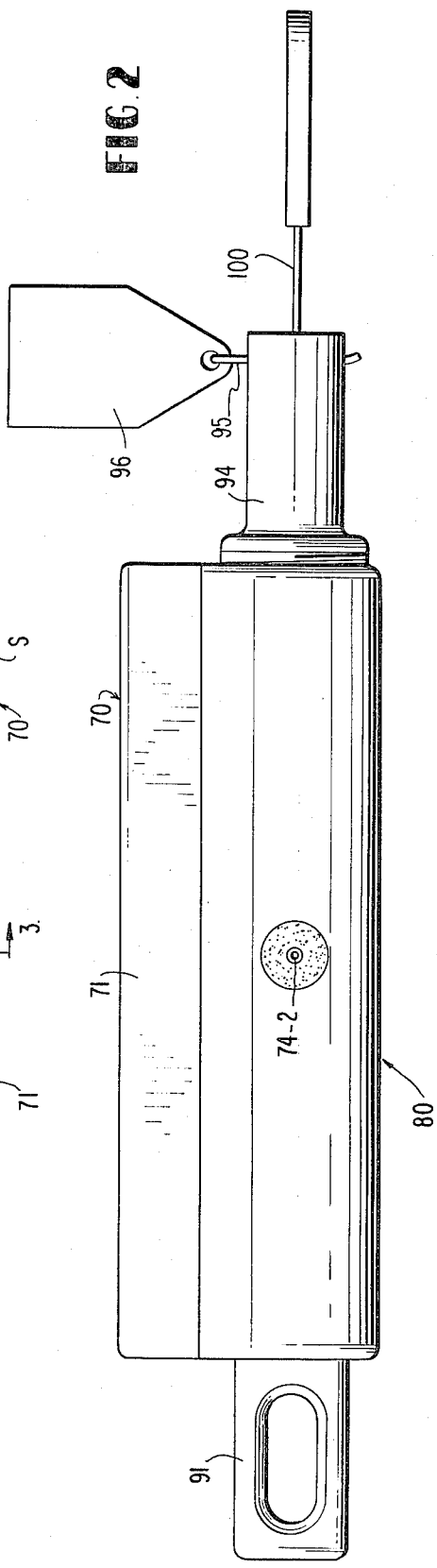
FIG. 2 is a side elevational view with the safety-pin tag in place.
Figure 3:
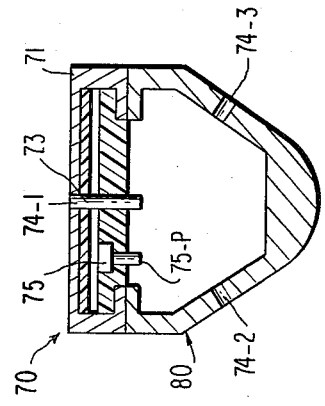
FIG. 3 is a cross-section taken on lines 3—3 of FIG. 1.

As shown in FIGS. 1 and 2, the altitude sensor module 70 is constituted by a generally rectangular housing cover member 71 which contains therein an electronics module (see FIG. 3) and is secured to the refurbishment module 80 by recessed captive screws. Cover 71 has an opening 72 which connects to a passageway 73 which constitutes a static port 74-1 and tube for the admission of ambient atmospheric pressure to the interior of the unit. At the same time, two additional openings 74-2, 74-3 in the refurbishment module housing 80 are connected by means of tubes and/or passageways through a potting compound (if used) (not shown in FIGS. 3 and 4) to the vicinity of the pressure transducer 75 (FIG. 3) by passageway 75-P.

The three static ports are important and insure altitude accuracy up to about 650 foot per second descent rates over an approximately 10,000 foot operating altitude range of the unit. It will be appreciated, of course, that other rates may be utilized and other port combinations. The three ports are employed to thereby provide static air regardless of the altitude of the descending unit with regard to relative wind angle. As a result, the altitude error due to relative wind effects is minimized. The ratio of internal volume to static port size is designed to prevent altimeter lag effect from exceeding 20 milleseconds for altitude rates up to 650 feet per second. For this reason, the potting (if used) shown in FIG. 5 in the refurbishment module as well as in the altitude sensor module provides an internal volume to static port size (the three ports shown) to reduce this altimeter lag effect. By reducing the volume of the space and/or providing more ports or, alternatively, ports with large passageways, the lag may be further reduced. However, it is important that the static air pressure only be measured and the altitude error of the decending unit with respect to the relative wind angle be minimized. It will be noted, therefore, that the provision of a static port in the cover plate containing the altitude sensor module as well as in the two opposite opposing sides of the housing for the refurbishment module assures that the different wind angle effects are taken account of and also assures that there is no altimeter lag which exceeds 20 milliseconds for descent rates up to 650 feet per second. As indicated earlier, the rate may be varied as well as the time lag provided that these parameters of the invention are kept in mind.

The cover 71 of the altitude sensor module 70 has three openings therein 76, 77 and 78. Openings 76 and 77 provide access through the cover plate 71 to two screwdriver-adjustable selection means or switches 82 and 83 with the screwdriver slots 84 and 85 being in the form of arrows pointing to indicia printed or engraved on the cover plate 71 about the openings or holes 76 and 77. Thus, switch operator 82 is used for entering altitude selections in 1000 foot increments and the digits 0 through 9 which are printed or screened about the opening 76 correspond to 0 foot settings through 9000 foot settings in 1000 foot increments. In like manner, opening 77 has the indicia 0 through 9, screened or engraved thereabout in equal increments of about 36 degrees and correspond to 100 foot increments of altitude. Thus, with the arrow-screwdriver slot 84 pointing to the digit 7 and the arrow-screwdriver slot 85 pointing to the digit 1, the instrument is set for an altitude of 7100 feet.

A similar opening 78 is provided for introducing barometric pressure for the drop zone into the instrument. In this case, the opening 78 has printed or engraved thereabout in equal 36 degree increments, the designations beginning with the lowest pressure 29.5 and in decimal increments in 1/10 inch of mercury through 30.4 inches of mercury. A similar selection switch operator 88 having an arrow-screwdriver slot 89 therein is provided for entering, by way of a screwdriver adjustment, the barometric pressure at the drop zone. It is to be emphasized that the switches are detented switches with each of the positions, and are commercially available and require that the switch actuator 76, 77 and 78 be flush with or below the exterior level of the cover 71. This assures that the user must positively set the drop zone altitude settings into switches 82, 83 and 88.

There is also an additional advantage in providing two ten position detented switches for entering the selected altitude and selected barometric pressure for entering the drop zone barometric pressure compensation. Thus, instead of using a one turn potentiometer and calibrating the dial in marked-off spacing of three degrees representing increments of 100 feet, a much easier field use instrumemt is provided by increments of approximately 30 degrees or more (360 degrees divided by 10 positions).

In addition to the openings for the static port and tube and altitude and barometric pressure selection, three additional openings TP-1, TP-2 and TP-3 may be provided for various test points in the electronic circuitry. Also a removable cover is provided which when removed provides access to calibration potentiometers.

REFURBISHMENT MODULE

The refurbishment module 80 contains the webbing cutter 91, a thermal battery 94 (see FIG. 5), an arming assembly 92 and a safety-pin 95. As shown in FIG. 5, the cross-sectional shape of the housing for the refurbishment module is generally triangular with the static ports 74-1 and 74-2 in the lower exposed sides thereof with the upper side surfaces thereof having the same parametrical outline as the housing for the altitude sensor module 70. Battery 94 and arming assembly 92 are shown in greater detail in FIG. 5 and as there shown, the battery 94 is activated by a percussion cap 97. The percussion cap is exploded or set off by the operating of the arming assembly 92. Arming assembly 92 includes a safety-pin 95 and pull hang tag 96 secured thereto. The arming pin 95 passes through two holes 97 and 98 in housing 99 and prevents withdrawal of the firing pin lanyard 100. Firing pin lanyard 100 is connected to the eyelet 101 of a pin 102 coaxially centered in a bore 103 of housing 99. A shaft 104 having a firing pin 105 at one end thereof has, at the opposite end thereof, and in interfitting and in interlocking relation with the end of shaft 102, interfitting locking abutments 104A and 102A. A compression spring 106 centered coaxially about shaft 104 is seated at the bottom of bore 107 in housing 99 and against a shoulder or flange 108 on shaft 104. With the arrangement as shown, the interlocking abutments 102A and 104A are maintained in position by the walls of bore 103. Thus, when the arming pin 95 is removed by its tag 96, the lanyard 100 may be pulled outwardly which, in turn, due to the interlocking of abuttments 102A and 104A, loads the spring 106 and as the interlocking abuttments 102A and 104A pass beyond the end of bore 103, they disengage by cam action so as to release the rod 104 and the firing pin 105. The spring therefore unloads, driving the firing pin against percussion cap 97 to thereby activate battery 94.

This supplies power for approximately 120 seconds via conductors 110 to selected pins in connector 111. This power is thereby supplied through the connector to the altitude sensor module and powers up that unit. It will be appreciated that the lanyard is pulled upon the dropping of the cargo with its chute attached from an aircraft or the like. As described earlier is connection with the altitude sensor module, there is a time delay of 4-5 seconds to permit the unit to exit from the aircraft and pass the turbulence thereof. Subsequently, upon the unit reaching the altitude entered into the unit, it may be several hundred feet in advance of that since the deployment of the chute takes certain time, a signal is received from the altitude sensor module through the connector 111 onto conductors 112 which extend into a wire ignited explosive unit 130. This explosive unit or pyrotechnic unit 130 thereby explodes to provide a high energy driving force to the cutter blade 140. Cutter blade 140 is maintained in position in bore 141 by shear pin 142. It will be appreciated that instead of cutting the shrouds passing through shroud opening 145 and/or other mechanism for releasing and deploying the parachute, the signal received on conductors 112 may be used for actuating a release mechanism or other utilization device for other applications of the invention. A potting compound may be used to fill the space around conductors 110 and 112, and the passageways (not shown) to ports 74-2 and 74-3. The amount of potting compound sets the ratio of internal air volume to static port size which prevents the altimeter lag effect from exceeding about 20 milliseconds for altitude rates up to 650 feet per second. This rate is for one particular embodiment, it being clear that other rates, depending in part on the characteristics of the barometric pressure transducer, may easily be designed into the unit by adding more static ports, increasing the cross-sectional area and/or changing the air volume enclosed between the two-part housing assembly.

Referring now to FIG. 6, the barometric transducer 30 is supplied with a regulated voltage from supply 31. The supply 31 includes a chemical battery B which is activated upon the release of the lanyard as described earlier herein and has an output for approximately 120 seconds which is more than ample time for the operation of the staging unit. This voltage is applied to the barometric transducer between terminal 5 and ground terminal 2. The output on terminal 1 of barometric transducer 30 is applied through a resistor 32 to the positive terminal input of comparator 33. A feedback resistor 34 (4.7 megohm) is connected between the output terminal of comparator 33 and the barometric transducer input 35.

COARSE ALTITUDE SELECTION

The second input to comparator 33 is a derived voltage which is directly correlated to the altitude at which the unit is set to operate. This voltage is derived in a staging altitude voltage generator which generates a constant voltage having an amplitude directly proportional to the predicted barometric pressure at the selected altitude for staging. It is constituted by a resistor 36, one end of which is connected through a proportioning resistor 37 which, with resistors 38 and potentiometer resistor 39 form a voltage divider. Resistor 39 is a nulling potentiometer so as to adjust the level of voltage supplied as one input to negative feedback amplifier 40. A similar voltage from the opposite end of resistor 36 is connected to a voltage dropping string or ladder network constituted by resistors 40-1, 40-2, 40-3, 40-4, 40-5, 40-6, 40-7, 40-8, 40-9 and 40-10. Each of these resistors, which has the exemplary value shown on FIG. 6 of the drawing, is proportioned to take into account the non-linearity in altitude change with barometric pressure as sensed by the transducer 30. The intermediate point between each of these resistors is connected respectively to a terminal on the coarse altitude selection switch 50 (adjustment 95, FIG. 1) which selects the individual discrete points between the voltage divider. The resistors 40-1 . . . 40-10 are proportioned or scaled to provide 1000 foot increments of voltage drop. (It will be appreciated that other increments of altitude could be used with appropriate changes in the scaling of the resistors). Each of the intermediate points between the resistors is connected to a terminal on selector switch 50, so that the uppermost point on the voltage divider chain is connected to point 9 or the 9000 foot plus level range selection, the second point is connected to the 8000 foot plus level select and so on down to the zero plus select range. The wiper on selector switch 50 is connected through a gain control potentiometer 51 and through a proportioning resistor 52 to a summing point 53 which constitutes the input to amplifier 40.

FINE ALTITUDE SELECTION

Output terminal 42 of amplifier 40 is connected through a resistor 43 to a point on a second voltage dropping resistor string constituted by resistors 44-1, 44-2, 44-3, 44-4, 44-5, 44-6, 44-7, 44-8, 44-9, and 44-10. A further proportioning resistor 45 is used to connect the upper end of the string to the 15 volt supply. The voltage fed back through resistor 43 is added on to this voltage. The intermediate points 44-1, 44-2, 44-3, 44-4 and so on through 44-10 are connected to a second altitude selection switch 55. The wiper 55W of fine altitude selection switch 55 is connected through a large resistor 56 (1 megohm) to the summing point 53. Thus, with the wiper 50W of altitude selection switch 50 on, for example, the 8000 foot range, and with the wiper 55W of altitude selection switch 55 on the 200 foot range, the set altitude is 8200 feet. This constitutes a means for deriving from the voltage selected by the first selector 174 a second Plurality N of discrete voltage steps which are always equal to a selected fraction $N-1/N$ of the difference between the first selected voltage and the next higher step of the first plurality of discrete voltage steps to thereby provide a voltage which is combined with the coarse altitude selection voltage.

BAROMETRIC PRESSURE COMPENSATION

In order to compensate for variation in barometric pressure at the drop zone, a barometric pressure selection switch 60 is provided which has its contact points 60-P connected to the same points on voltage divider chain 44-1 to 44-10 as the points on altitude selection switch 55. The wiper 60W of barometric correction switch 60 is connected through an isolating resistor 61 (one megohm) to the summing point 53. A large resistor 64 isolates the two signal voltages from the output of amplifier 40 and assures that these voltages are added or summed at summing point 53 with the coarse altitude voltage selected by the wiper 50W of coarse altitude selection switch 50.

OPERATION

The output voltage from amplifier 40 is thus a fixed voltage which has been generated to correspond to the voltage at which the parachute is to be deployed. This voltage then is supplied as the second input to the comparator 33 and as soon as the voltage output of barometric transducer 30 as applied to the positive terminal of comparator 33 is equal to this set voltage, an output is provided from comparator 33 which is applied across input resistor voltage 170A-170B of comparator 171. There will be no output from the comparator 171 as long as the input to the negative terminal is absent. As soon as the lanyard 192 is pulled and the battery is activated, the regulated voltage is also applied across a voltage divider constituted by resistors 172 and 173. This voltage is applied through a delay amplifier 174 which has a feedback connection constituted by a parallel resistor 178 and capacitor 179 and shunt capacitor 180. This provides a delay of 4-5 seconds before there is any output from delay amplifier 174 to the negative input of terminal 171. This assures that the altitude sensing and pyrotechnic firing circuits are inhibited for 3-4 seconds after the arming pin or lanyard is pulled to prevent false activation due to turbulence as the load exits from the aircraft. The signal appearing at the output of comparator 171, after this 3-4 second time delay is used to energize the electronic switch which fires the pyrotechnic device P that actually operates the cutter to deploy the parachute. The output from comparator 171 is coupled through resistance 195 and integrating capacitor 176 and applied to base resistor 177 of a Darlington connected transistor switch pair 178 which, when switched on, activates pyrotechnic explosive device P which, in turn, drives the cutter blade.

While certain illustrative features of the invention have been shown in its preferred embodiment, it is understood that the concept of the invention may be employed in other embodiments without departing from the spirit and scope thereof. For example, instead of a triangularly shaped refurbishment module, other configurations may be used. Other forms of electronic circuitry for detecting the altitude may be used. Both the battery and the pyrotechnically actuated blade may themselves be replaceable, e.g. with plug-in connections to wires 110 and 112, respectively, so that all of the expendible components may be replaced further lowering the cost per use. A further adjustment for ambient temperature may be incorporated in the circuit, and this may be by a further manual adjustment or by electronic measurement of temperature. These and other embodiments and obvious variations of the invention are intended to be encompassed by one or more of the claims herein.

What is claimed is:

1. An altitude sensor parachute staging unit comprising,
    a first housing assembly containing an electronic barometer pressure transducer and altitude selection means for producing a parachute deployment signal,
    a second housing assembly containing a direct current electrical power supply and an electrically activated cable cutter for cutting a parachute deployment cable,
    complementary electrical connector means on said first and said second housing assemblies for coupling electrical energy from said power supply to said electronic barometer pressure transducer and altitude selection means contained in said first housing and for coupling said parachute deployment signal from said first housing assembly to said second housing assembly to activate said electrically activated cable cutter at a selected altitude during descent of said altitude sensor parachute staging unit.

2. The altitude sensor parachute staging unit defined in claim 1 wherein there is at least one static pressure port in one of said housing assemblies for exposing said electronic barometric pressure transducer to ambient barometric pressure changes.

3. The altitude sensor parachute staging unit defined in claim 2 wherein there are a plurality of said static pressure ports, at least one in each said housing assembly and the ratio of volumetric air space between said first and second housing assemblies and static pressure port is such as to prevent altimeter lag effects from exceeding a selected rate.

4. The altitude sensor parachute staging unit defined in claim 2 including means flush with or below the surface of said first housing assembly for entering a selected altitude to said altitude selection means.

5. The altitude parachute staging unit defined in claim 2 including means flush with or below the surface of said first housing assembly for entering ambient atmospheric pressure at the drop zone into said altitude selection means.

6. The altitude sensor parachute staging unit defined in claim 1 wherein said direct current electrical power supply includes a chemical battery, and percussion means for activating said chemical battery.

7. The altitude sensor parachute staging unit defined in claim 1 wherein said electronic barometric pressure transducer has a very low mass so that ground impact and deceleration forces have no effect on mechanical displacements of said unit whereby said first housing unit and the electronics contained therein may be used again.

8. The altitude sensor parachute staging unit defined in claim 1 wherein said first housing assembly has a perimetrical mating outline corresponding to a mating perimetrical outline on said second housing unit.

9. An altitude sensor parachute staging unit as defined in claim 1 wherein said electronic barometric pressure transducer and altitude selection means for producing a deployment signal includes
    a barometric pressure transducer for producing a voltage which is proportional to barometric pressure,
    reference voltage generator means for generating a voltage substantially corresponding to said selected altitude, said reference voltage generator including
    (1) a source of constant voltage,
    (2) non-linear voltage divider means for dividing the constant voltage from said source into a plurality of discrete voltage steps corresponding to a coarse altitude range, (3) first selector means for selecting one voltage of said plurality of discrete voltage steps, (4) means for deriving from the voltage selected by said selector means a second plurality N of discrete voltage steps which are always equal to a selected fraction $N-1/N$ of the difference between the first selected voltage and the next higher step of said first plurality of discrete voltage steps, (5) second selector means for selecting one voltage of said second plurality of discrete voltage steps, summing means for electrically summing the voltages selected by said first and second selector means, and comparator means for comparing the voltage produced by said summing means with the voltage from said transducer and indicating when the compared voltages are substantially equal to constitute said parachute deployment signal.

10. An altitude measuring system for indicating a selected altitude comprising in combination, a barometric pressure transducer for producing a voltage which is proportional to barometric pressure, reference voltage generator means for generating a voltage substantially corresponding to said selected altitude, said reference voltage generator including (1) a source of constant voltage, (2) non-linear voltage divider means for dividing the constant voltage from said source into a plurality of discrete voltage steps corresponding to a coarse altitude range, (3) first selector means for selecting one voltage of said plurality of discrete voltage steps, (4) means for deriving from the voltage selected by said selector means a second plurality N of discrete voltage steps which are always equal to a selected fraction $N-1/N$ of the difference between the first selected voltage and the next higher step of said first plurality of discrete voltage steps, (5) second selector means for selecting one voltage of said second plurality of discrete voltage steps, summing means for electrically summing the voltages selected by said first and second selector means, and comparator means for comparing the voltage produced by said summing means with the voltage from said transducer and indicating when the compared voltages are substantially equal.

11. The altitude measuring system defined in claim 10 wherein said reference voltage generator means includes a third selector means for selecting a further voltage of said second plurality of discrete voltage steps, and means for supplying said further voltage to said summing means.

12. The altitude measuring system defined in claim 10 wherein said barometric pressure transducer is a solid state transducer.

* * * * *